United States Patent

[11] 3,572,778

[72] Inventor Thomas R. Cassel
 Birmingham, Mich.
[21] Appl. No. 837,985
[22] Filed May 26, 1969
[45] Patented Mar. 30, 1971
[73] Assignees Thomas R. Cassel;
 Kenneth W. Cassel; R. Nelson Cooksey;
 William E. Neighbors, , fractional part
 interest to each; Keevin J. Cassel
 Continuation-in-part of application Ser. No.
 657,823, Aug. 2, 1967, now abandoned.

[54] PIPE COUPLING
 35 Claims, 27 Drawing Figs.
[52] U.S. Cl. .................................................. 285/382,
 287/109, 29/526
[51] Int. Cl. .................................................... F16l 13/14
[50] Field of Search ........................................... 285/382,
 382.1, 382.2, 403, 404, 424, 400, 420, 405, 406,
 330, 407, 410, 199; 287/104, 118, 103, 58, 109,
 58 (CT), 119, 54, 189, 36 (C, D & F); 272/60,
 56.5; 52/726; 211/182; 29/525, 426, 526, 523

[56] References Cited
 UNITED STATES PATENTS
 115,906 6/1871 Stine ............................. 285/407
 1,861,814 6/1932 Peters ........................... 29/526UX
 1,331,150 2/1920 Hooper ......................... 29/526UX
 2,140,064 12/1938 Tinnerman .................... 29/526UX Primary Examiner—David J. Williamowsky
Assistant Examiner—Wayne L. Shedd
Attorney—Barnard, McGlynn & Reising ABSTRACT: A pipe coupling as disclosed in which two pipe sections are joined together with the end of one being preformed and inserted into the end of the other. The inner pipe section is provided with a deformation so that its outer peripheral length is not substantially less and may be greater than the inner peripheral length of the outer pipe section. Force applying means, such as a threaded fastener, is adapted to act between the inner and outer pipe sections to apply a drawing force in a vicinity of the deformation, whereby the walls of the pipe sections are caused to conform in close engagement. Securing means are provided to maintain the inner pipe section in compressive stress and the outer pipe section in tensile stress whereby a mechanically strong and fluid tight joint is produced.

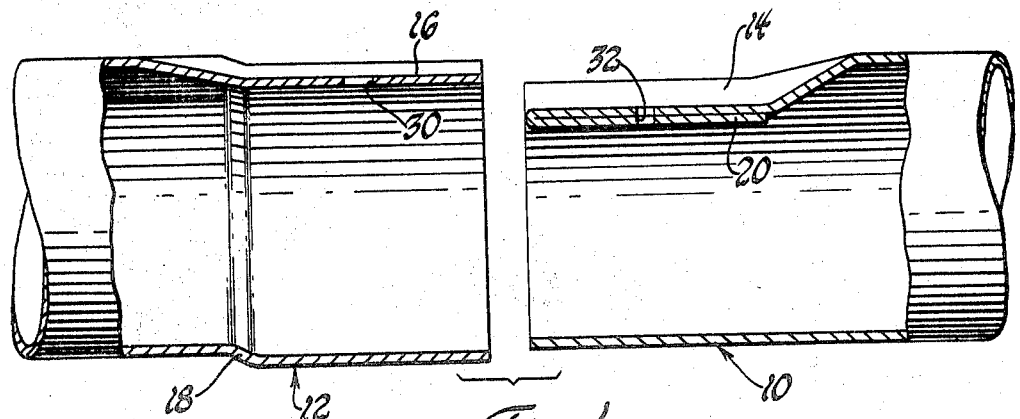
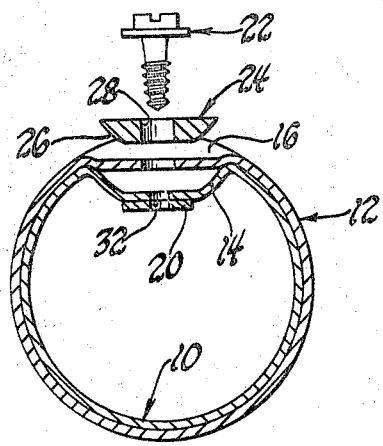
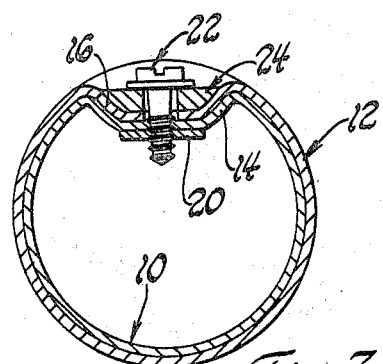
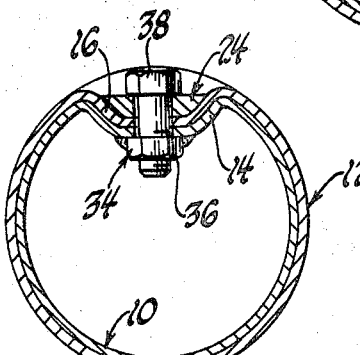
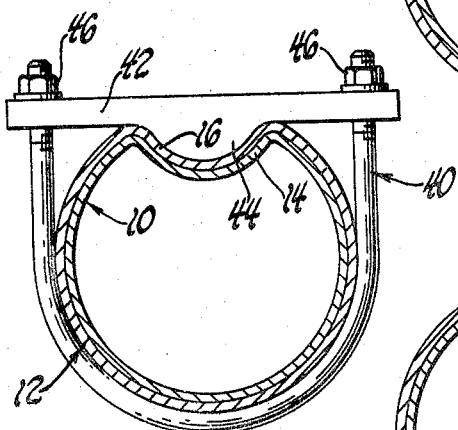
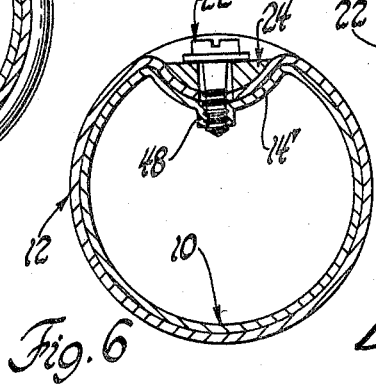
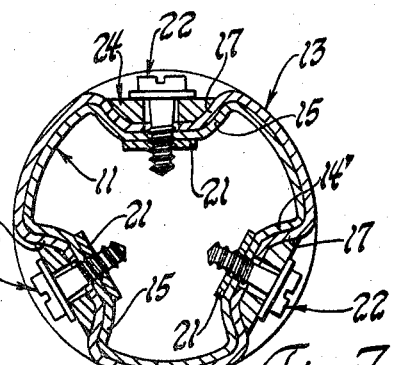

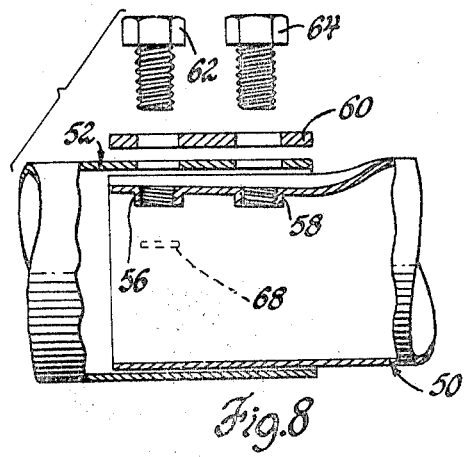
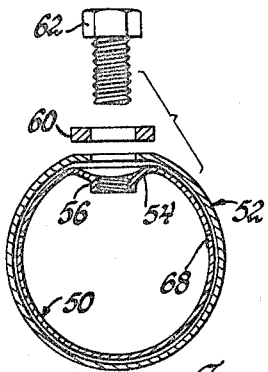
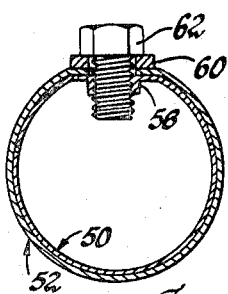
Fig.8　Fig.9　Fig.10
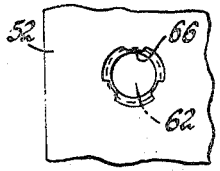
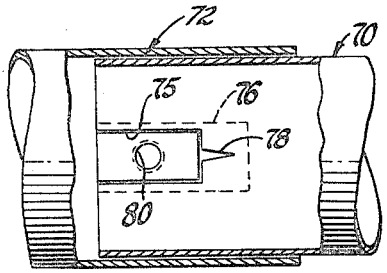
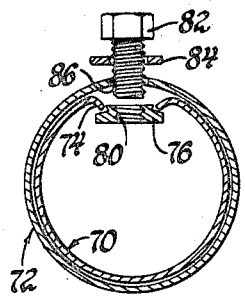
Fig.11　Fig.12　Fig.13
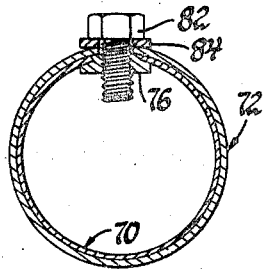
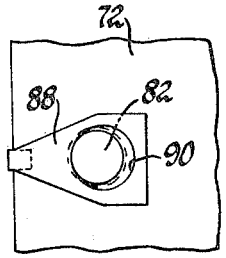
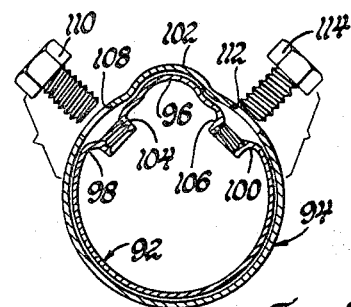
Fig.14　Fig.15　Fig.16
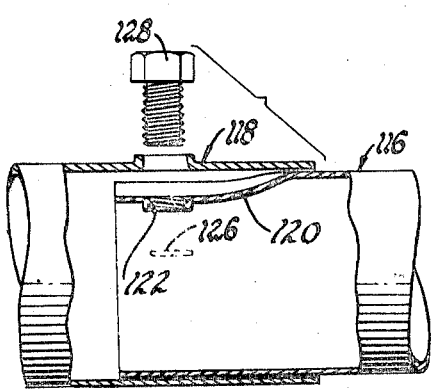
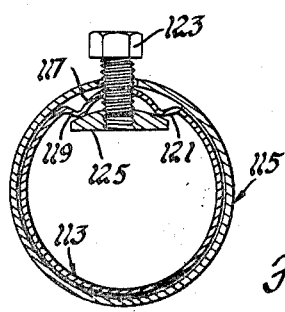
Fig.18　Fig.17
INVENTOR.
Thomas R. Cassel
BY
Barnard, McGlynn & Reising
ATTORNEYS

PATENTED MAR 30 1971 3,572,778

INVENTOR.
Thomas R. Cassel
BY
Barnard, McGlynn & Reising
ATTORNEYS

PIPE COUPLING

This application is a continuation-in-part of application Ser. No. 657,823 filed Aug. 2, 1967, the entire disclosure of which is incorporated herein by reference.

This invention relates to pipe couplings, and more particularly to a pipe coupling in which exceedingly close fitting mechanical engagement is provided between telescoped pipe sections.

There are many applications of pipes, either as conduit members or structural members, wherein it is desirable to provide a strong coupling by means of the pipe sections themselves without the need for extraneous holding or sealing members. For this purpose, it is highly desirable to obtain an exceedingly tight mechanical engagement between the pipe sections for good mechanical strength and/or a fluid seal. This invention is applicable to pipes of a wide variety of cross-sectional shapes and to various combinations of wall thicknesses of the telescoping pipe sections even to the point of having the inner pipe section of solid cross section.

There are many situations where pipes or thin-walled tubing are utilized to convey fluids from one point to another. In such situations, it is often necessary and/or desirable to make the overall pipe system out of a number of pipe sections. Consequently, fluid tight seals at the connections between such pipe sections must be provided to prevent leakage of fluid from the system, and/or to prevent entry of dirt or other impurities into the system. A typical example of such a pipe line is in the exhaust system of a motor vehicle, wherein pipe sections are utilized to convey exhaust gases from the exhaust manifold of the engine to the rear of the vehicle for discharge to the atmosphere. The routing of the system is complex, because of the construction of the automobile, thus requiring several pipe sections and pipe couplings in order to properly manufacture and assemble the system. Leakage at any pipe coupling is detrimental to the system as a whole, as well as to the engine operation, and is wholly undesirable.

There are also many situations where pipes are utilized as structural members as, for example, in static structures such as scaffolds and in power transmitting equipment such as propeller shafts. In such applications it is often desirable to make the structure from a number of pipe sections and, of course, it is necessary to have a mechanically strong coupling therebetween.

There are numerous methods and articles available for coupling pipe sections together most of which rely upon some sort of clamp or U-bolt in order to secure a telescoping arrangement of the adjacent pipe ends. A more permanent connection may be accomplished by welding or the like, and numerous sealing devices are known which are intended to prevent leakage at the coupling. However, these devices or methods have disadvantages of one kind or another. Most pipe clamps and U-bolts do not provide a complete 360° seal, thus permitting leakage to develop at those points where there is no clamping engagement. Further, U-bolts and the like provide only line contact and clamping, thus limiting the axial area of pipe-to-pipe engagement for sealing. Welding of a pipe joint is expensive and can only be accomplished with certain types of pipe materials. All in all, the presently available pipe coupling methods and devices are expensive, complicated and time consuming to assemble, and utilize numerous extra parts which must be put together with care and precision in order to provide a nonleaking coupling.

In many of the applications mentioned above, it is highly desirable that the pipe joints be adapted for repeated assembly and disassembly without deterioration of the joint. Furthermore, it is desirable to be able to assemble the joint by insertion of the end of one pipe section into the other as in a telescope connection without the need for rotary motion. Additionally, it is desirable in some instances to provide for indexed alignment or predetermined orientation of the two pipe sections relative to each other. It is particularly desirable to in making pipe joints on a production line basis to have only the two pipe sections to be brought together to form the joint with all of the necessary parts preassembled therewith, such as by the use of captive fasteners and the like.

In accordance with this invention, there is provided a pipe coupling in which two pipe sections are joined together by preforming the end of at least one of the pipe sections and inserting the end of one into the end of the other and then deforming the wall configuration of one pipe section by applying a force between the pipe sections to produce a fit in which the inner pipe section is held in compressive stress and the outer pipe section is held in tensile stress. In this coupling stresses may be produced and maintained at values which correspond to those that would be produced by a telescopic arrangement of an inner pipe section and an outer pipe section with substantially zero or a negative allowance in the dimensions. The resulting coupling is somewhat analogous to the interference fit produced by heat shrinking and that produced by force fitting; however, in accordance with the invention the pipe sections are telescoped together with substantial clearance and without temperature differential or substantial force and then the desired fit is produced with the parts in assembled relation and means are provided to maintain high stress values. This is accomplished by preforming one or both of the pipe sections so that the inner pipe section has cross-sectional dimensions which are less than the cross-sectional dimensions of the opening in the outer pipe section. The inner pipe section is provided with a peripheral length on its outer surface not substantially less than the peripheral length of the opposed surface of the other pipe section. In a preferred embodiment of the invention, the peripheral length on the outer surface of the inner pipe section is greater than the peripheral length on the inner surface of the outer pipe section. This is accomplished by preforming one or more inward or outward deformations having a net inward value on the inner pipe section and, if desired, a deformation may be preformed on the outer pipe section. Force applying means, such as a screw threaded fastener, acts between the inner and outer pipe sections tending to pull the two members together, preferably at said deformations, and thereby deforming the pipe sections so as to cause the wall configuration thereof to conform to each other with the outer member in tensile stress and the inner member in compressive stress. The stresses are maintained at a level higher than the residual stresses by the fastener connected therebetween. The result of this construction is a pipe coupling of exceptionally good mechanical strength and unusually good sealing properties. Furthermore, by releasing the force applied by the fastener means, the stresses in the inner and outer pipe sections are relaxed and the coupling may be readily disassembled and reassembled.

An exemplary device in which this invention is embodied comprises, generally, a pipe coupling in which a pair of pipe ends are telescopingly engaged and at least one of the pipe ends is deformed at its engaging end with an inward indentation. When the pipe sections are telescopingly joined, securing means passing through the pipe sections and through the deformity in the one pipe end forces the other pipe to deform about the one pipe and conform its engaging surface to the engaging surface of the one pipe.

The securing means may take the form of a self-threading screw, a nut and bolt assembly, a correspondingly formed saddle of a U-bolt assembly or other means, such that the clamping together of the pipe sections forces one of the pipe sections to deform and conform itself to the shape of the other pipe.

A significant aspect of the invention is that the pipe sections to be joined may be preformed in such a manner that the invention is practical for use in assembly production operations. The preforming may be accomplished simultaneously with a sizing operation performed on the end of the pipe section and need not be held to close tolerances. With the pipe sections in the preformed condition, i.e. with a cross-sectional shape or wall configuration which is retained with the application of any external forces, the inner pipe section may be telescopically inserted into the opening of the outer pipe section. By virtue of the smooth inner and outer surfaces to be engaged in forming the coupling, the interfitting can be accomplished with a small clearance and a large amount of deformation is not required in the preforming operation. In producing the deformation to effect the coupling, the deforming force is applied in such a way that the inner pipe section is placed in compression, and the outer pipe section is placed in tension. This is accomplished by applying a drawing force between the two pipe sections so that the force acts upon one pipe section and reacts upon the other without any external reaction member. With the drawing force applied to the pipe sections at a localized area, as by a threaded fastener, the tensile and compressive stresses are distributed in a band around the periphery of the pipe sections and by a single fastener the stresses may be maintained at a high value to enhance the mechanical strength and the fluid sealing characteristics of the coupling.

A pipe coupling, so constructed, provides a complete surface-to-surface 360° seal with little possibility of leakage. It is inexpensive to manufacture and is very simple to assemble, both in terms of the number of parts involved and the time involved to complete the connection. There are few extra parts that need to be put together, and great precision in the assembly is unnecessary. Minimum clearance is required about the pipe coupling, thus increasing the versatility, system design possibility and usage of the pipe coupling relative to adjacent parts.

These and other advantages will become more apparent from the following description and drawings in which:

FIG. 1 is an elevational view with parts broken away and in section of two adjoining pipe sections formed in accordance with the invention to be telescopically received.

FIG. 2 is a cross-sectional view of the pipe sections illustrated in FIG. 1 in the assembled position, and showing one form of securing means.

FIG. 3 is a cross-sectional view of the pipe sections illustrated in FIGS. 1 and 2, showing the securing means in place.

FIG. 4 is a cross-sectional view of a pipe coupling embodying the invention and showing a modification of the securing means.

FIG. 5 is a cross-sectional view of a pipe coupling embodying the invention and showing another modification of the securing means.

FIG. 6 is a cross-sectional view of a pipe coupling embodying the invention and showing yet another modification of the securing means.

FIG. 7 is a cross-sectional view of a pipe coupling embodying the invention and showing a plurality of securements between the pipe sections.

FIG. 8 illustrates an embodiment of the invention with an inward deformation on the inner pipe section and additional constructional features.

FIG. 9 is a cross-sectional view of the coupling shown in FIG. 8.

FIG. 10 shows a cross-sectional view of the coupling shown in FIG. 8 with the pipe sections drawn into coupling engagement.

FIG. 11 shows a detail of construction of the embodiment of FIG. 8.

FIG. 12 shows another embodiment of the invention.

FIG. 13 is a cross-sectional view of the embodiment shown in FIG. 12.

FIG. 14 is a cross-sectional view of the embodiment in FIG. 12 showing the pipe sections drawn into coupling engagement.

FIG. 15 shows a detail of construction which may be used with the embodiment shown in FIG. 12.

FIG. 16 shows a cross-sectional view of an embodiment of the invention using an outward deformation on both the inner and outer pipe sections.

FIG. 17 shows another embodiment of the invention with an outward deformation on the inner pipe section.

FIG. 18 shows an embodiment of the invention with an inward deformation on the inner pipe section and additional structural features.

Figure 19:
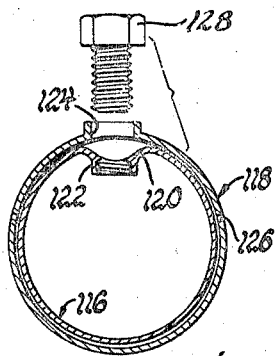
FIG. 19 shows a cross-sectional view of the embodiment shown in FIG. 18.

The invention will be described in detail with reference to several embodiments characterized by exceedingly close fitting mechanical engagement of the coupling members at the joint thereof. Such a close fit is obtained in practice of the invention by using an inner pipe section with a peripheral length on its outer surface which is not substantially less than and which may be substantially greater than the peripheral length of the opposed inner surface of the outer pipe section. Within this range of relative peripheral lengths, the pipe sections can be preformed in cross section so that one can be inserted into the other without interference; then the cross sections or wall configurations of one or both can be deformed into conformity with each other by application of a drawing force acting between the two. In the case of the peripheral lengths of the inner pipe section being substantially greater than the peripheral length of the opposed inner surface of the outer pipe section, the drawing force will produce tensile stress in the outer section and compressive stress in the inner section. These stresses may be increased by increasing the drawing force which may be done until there is no longer any clearance between the inner and the outer sections in the region where the drawing force is applied. If these pipe sections were preformed as described and then separately deformed into the same size and shape as that resulting from the drawing force applied between them, the inner pipe section would be oversize with reference to the opening in the outer pipe section, i.e. the dimensional relations would be such that the sections would have a negative allowance and would be classified as an interference fit. In the case of the peripheral length of the inner pipe section being not substantially less than the peripheral length of the opposed inner surface of the outer pipe section, the drawing force will also produce tensile stress in the outer section and compressive stress in the inner section. Even though the peripheral length of the inner section is slightly less or equal to that of the outer section, there will be surface and shape irregularities resulting in slight mismatches or nonconformities which, if the sections were separately deformed, would cause interference in fitting the sections together. This case, insofar as peripheral lengths are concerned, is analogous to a class of fit, such as a snug fit, with zero or small positive allowance. The aforementioned surface and shape irregularities occur inevitably in pipe sections as a result of forming or sizing operations, unless precision machining is employed, and the distribution is of a random nature over the surface so that mechanical engagement and fluid sealing is not seriously impaired so long as the peripheral length on the inner section is not substantially less than the peripheral length on the outer section. Thus, the coupling of this invention has inner and outer pipe sections in close fitting mechanical engagement with the outer section in tensile stress and the inner section in compressive stress, the stresses being produced by a drawing force acting between said sections. The stresses are maintained at a value higher than the residual stresses of deforming (i.e. higher than the stresses which persist after the drawing force is removed) by maintaining the drawing force between the sections.

It will be appreciated as the description proceeds that pipe couplings of this invention may be formed of a wide variety of materials including metals, rubber and plastics. The two pipe sections of a coupling need not be of the same material and the wall thicknesses may vary widely. In a given coupling this may be governed by the tensile and compressive strengths of the materials. In the embodiments illustrated, the material is that commonly used in vehicle exhaust systems such as cold rolled steel and the wall thicknesses may be equal or substantially different. In any event, with the drawing force applied between the sections, both members will yield or deform to some extent even though it may be imperceptibly small.

Referring more particularly to the drawings, FIGS. 1 though 3 best illustrate the concept in which the invention is embodied. An inner pipe section, indicated generally by the numeral 10, is to be telescopingly inserted into an outer pipe section, indicated generally by the numeral 12. Pipe section 10, at one point around its circumference, is provided with a concave deformation 14, extending radially inwardly of the pipe section 10 and extending axially therealong over a portion of the end of the pipe. Although it is preferred that the deformity 14 be arcuate in shape, such deformity could also have straight walls, or the like. As will become hereinafter more apparent, it is important that the walls be so formed as to provide a circumferential strengthening effect on the pipe section 10.

Pipe section 12 may also be provided with a concave deformity 16 at the end thereof receiving the end of the pipe section 10, although such deformity 16 is not necessary to the practice of the concept. Alternatively, the end of the pipe section 12 could be flattened slightly, or could be used in wholly undeformed condition. Deformity 16, when provided, extends axially along a portion of the length of the pipe section 12. Pipe section 12 may be further upset, as indicated at 18, in a manner well known in the art for axial alignment of the pipe sections if such should be necessary or desirable.

It is preferable that pipe section 10 have an outer diameter that is not substantially less than the inner diameter of pipe section 12, and it is also preferable that the wall thickness of pipe section 10 be not substantially less than the wall thickness of the outer pipe 12, taking into consideration manufacturing tolerances and the like.

Pipe section 10 may be provided with an inwardly turned and axially extending flange 20 underlying the concave deformity 14. This may be accomplished by forming a tab extending outwardly from the pipe section 10 and in axial direction, during formation of the pipe end, which is then bent reversely inwardly to underlie the deformity 14, as illustrated in FIG. 1. The purpose for flange 20 will become hereinafter more apparent.

With the pipe sections telescopingly joined at the ends, and with concavity 16 overlying concavity 14 in spaced radial relation, the two pipe sections may then be secured together. Such securement may be accomplished by means of a self-threading screw, indicated generally by the numeral 22, and a washer member, indicated generally by the numeral 24, the washer having an outer surface 26 of generally the same shape as the concavity 14 in inner pipe member 10. Washer 24 is provided with a central aperture 28 overlying an aperture 30 in outer pipe section 12 and aperture 32 formed in inner pipe section 10 and the flange 20. As illustrated in FIG. 3, the self-threading screw 22 may be driven into the aperture 32 and tightened down to its full extent. Upon such tightening, the engaged portion of the outer pipe 12, as concavity 16 is forced toward the inner concavity 14, thus forcing the circumference of the pipe section 12 to stretch and conform to the shape of the outer surface of the inner pipe 10. In so doing, there is complete surface-to-surface contact about the periphery of the inner pipe 10, and any possibility of leakage is avoided. The inturned flange 20 provides the thickness of material necessary to receive the threads of screw 22.

Referring next to FIG. 4, a modification in the means of securement is illustrated, where an outer pipe section 12 is joined to inner pipe section 10 at the concave deformities 14 and 16 by means of a nut-and-bolt assembly indicated generally by the numeral 34. A nut 36 may be welded or otherwise secured to the under surface of the inner deformity 14, in registry with the aperture 32 formed therein, so that the inner pipe 10 may be transported from place to place with the nut 36 securely installed. Upon assembly and connection of outer pipe 12 to inner pipe 10, the bolt 38 need only be inserted through the apertures 30 and 32 and properly driven home in the nut 36. Washer member 24 is properly disposed between the head of the bolt 38 and the outer surface of concavity 16 in pipe section 12.

Referring to FIG. 5, another modification of securing means is shown in which pipe sections 10 and 12 are provided with concavities 14 and 16 respectively, shown to be arcuate in shape, and a U-bolt, indicated generally by the numeral 40, surrounds the pipe coupling at a convenient location. The U-bolt saddle 42 has an enlargement 44 of substantially the same shape as the concavity 14 in the inner pipe section 10, so that upon tightening the nuts 46 on the ends of the U-bolt 40, the enlargement 44 will force the outer pipe 12 into the inner concavity 14 and the outer pipe 12 to stretch into conformity with the inner pipe 10.

Yet another modification of the securing means is shown in FIG. 6, wherein the inner concavity 14' is provided with a radially inwardly directed extruded flange 48 to provide sufficient thickness of material to receive the self-threading screw 22. The remaining parts are as hereinbefore described and are similarly numbered.

Referring next to FIG. 7, another modification of the pipe coupling is shown wherein an outer pipe section 13 is provided with a plurality of equally spaced concavities 17 about the circumference thereof, and an inner pipe section 11 is provided with an equal number of concavities 15 around the circumference thereof. Any of the aforedescribed securement means might be employed to secure the pipe sections 11 and 13 together, and for convenience, self-tapping screws 22 are illustrated as passing through suitably formed apertures and into suitably formed tabs 21 on the underside of the concavities 15.

It will be apparent that one or more points of securement may be provided around the circumference of the pipe coupling, depending upon the strengths required and the usage to which the pipe system is put. At the same time, it will be apparent that more than one securing means may be provided axially of the pipe coupling, should the design of the system so indicate. That is, in the pipe sections illustrated in FIG. 1, other sets of apertures may be formed in the deformities 14 and 16 in axially spaced relation to those illustrated. In such case, additional securing means, such as screw 22, will be employed.

Referring now to FIGS. 8, 9 and 10, there is shown an embodiment of the invention in a pipe coupling wherein an inner pipe section 50 is adapted to be coupled to an outer pipe section 52. The inner pipe section is provided with a preformed axially extending, inward deformation 54 with a pair of bolt holes 56 and 58 each bounded by an extruded flange. The inward deformation 54 produces a cross section or wall configuration of the inner pipe section 50 that it will fit within the wall configuration of the outer pipe section 52. It is to be noted that in preforming the inward deformation 54 the depth of the deformation is tapered so that it increases with axial displacement from the end of the pipe section. This provides a greater peripheral distance on the outer surface of the pipe section near the inner end of the deformation than is provided near the end of the pipe. Consequently, there is provided an increased peripheral tolerance between the inner and outer pipes as will be explained subsequently. The inner pipe section 50 has a peripheral length on the outer surface thereof which is equal to, or not substantially less than the peripheral length on the inner surface of the outer pipe section 52. By reason of the tapered depth of the deformation 54, this difference in peripheral length varies with axial displacement along the deformation 54. Therefore, should an outer pipe section and an inner pipe section be brought together which are at the opposite extremes of dimensional tolerance in their manufacture, the joint can still be successfully formed by reason of the variable quantity of material available for enlargement of the cross-sectional area of the inner pipe section. The pipe coupling is completed by the provision of an elongated washer or load plate 60 and a pair of bolts 62 and 64 passing therethrough into threaded engagement with the extruded flanges of bolt holes 56 and 58, respectively. When the bolts are tightened, as depicted in FIG. 10, the wall configuration of the inner pipe member 50 is changed so as to enlarge its cross-sectional dimension by deforming the inward deformation 54 outwardly causing the wall configuration to conform with the wall configuration of the outer pipe section 52 in close fitting engagement therewith. By reason of substantially zero or negative allowance in the dimensions, the outer pipe section 52 will be held in tensile stress and the inner pipe section 50 will be held in compressive stress.

As shown in FIG. 11, the bolt 62 and the washer 60 may be retained in captive relationship with the outer pipe section 52 by interlocking the threads of the bolt 62 therewith by means of tangs 66 projecting inwardly of the clearance hole in the outer pipe section 52. The inside diameter of the tangs 66 is preferably the same as the root diameter of the threads on the bolt 62. Bolt 64 may be similarly retained.

In FIGS. 12, 13 and 14 there is shown another embodiment of the invention wherein an inner pipe section 70 is adapted to be coupled to an outer pipe section 72. In this embodiment it is noted that, as in the case of the embodiment of FIGS. 8, 9 and 10, the peripheral length on the outer surface of the inside pipe section 70 is equal to or not substantially less than the peripheral length on the inside surface of the wall of the outer pipe section 72. In this embodiment of the invention the inner pipe section is preformed with an inward deformation 74 which at the inner portion thereof defines a slot extending axially of the inner pipe section. A spacer plate 76 is disposed within said slot and is secured to the walls of the inner pipe section as by a mechanical interlock as illustrated wherein the edges of the wall engage undercut shoulders at the sides of the spacer plate. As shown in FIG. 12, the slot in the inner pipe section 70 terminates in a wall portion which has a V-shaped notch 78 so as to facilitate deformation of the inner pipe section to enlarge the cross-sectional dimension thereof by pulling the deformation 74 outwardly. The spacer plate 76 has an axial length which extends beyond the slot 75 in the inner pipe section and beyond the notch 78 so as to provide a seal when pulled against the inner surface of the pipe section 70. The spacer plate 76 is provided with a tapped hole 80 adapted to receive the inner end of a bolt 82 which is provided with a washer 84 and which extends through the clearance hole 86 in the outer pipe section 72. When the bolt is tightened, as depicted in FIG. 14, the spacer plate 76 is drawn into engagement with the inner surface of the pipe section 72 thus enlarging the cross-sectional dimension of the inner pipe 70 so that the wall thereof conforms to the wall configuration of the outer pipe 72 and provides close fitting engagement therewith. In this condition the outer pipe section 72 is maintained in tensile stress and the inner pipe section 70 is maintained in a compressive stress.

As illustrated in FIG. 15, the bolt 82 and washer 84 may be retained in a captive relationship with the outer pipe section 72 by means of a spring clip 88. Spring clip is formed with a body plate having a clearance hole 90 therein having a diameter larger than the thread diameter on the bolt 82. The clip terminates in a bight portion which is adapted to hook over the end of the outer pipe 72 and grippingly engage the same with the body portion engaging the bolt at the root diameter of the threads in interlocking relation to form a subassembly.

Referring now to FIG. 16, the invention is embodied in a pipe coupling which comprises an inner pipe section 92 and an outer pipe section 94. The inner pipe section has a preformed wall configuration which includes an outward deformation 96 and a pair of inward deformations 98 and 100. The outer pipe section 94 is provided with an outward deformation 102. The wall configuration of the inner pipe section 92 has a peripheral length on the outer surface thereof which is equal to or not substantially less than the peripheral length on the inner surface of the outer pipe section 94.

The inner pipe section 92 is provided with a bolt hole 104 bounded by an extruded flange in the inward deformation 98 and with a bolt hole 106 and an extruded flange in the inward deformation 100. The outer pipe section 94 is provided with a clearance hole 108 in alignment with the bolt hole 104 which receives the bolt 110 in threaded engagement. Similarly, the outer pipe section 94 is provided with a clearance hole 112 in alignment with the bolt hole 106 which receives the bolt 114 in threaded engagement.

It will now be appreciated that when the bolts 110 and 114 are tightened, the walls of the inner and outer pipe sections in the vicinity of deformations 98 and 100 are deformed so as to cause close fitting engagement around the periphery. The inner pipe section is maintained in compressive stress and the outer pipe section is maintained in tensile stress. It is noted that the outward deformation 96 and 102 provide for assembly of the pipes in an oriented position and assure alignment of the holes which receive the bolts 110 and 114.

In FIG. 17 there is shown another embodiment of the invention in which an outward deformation is utilized to form the pipe coupling. In this embodiment the inner pipe section 113 is joined to an outer pipe section 115. The inner pipe section is preformed with a wall configuration having an outward deformation 117 which may have a maximum radius greater than that of the circular portion and which includes a pair of inward deformations 119 and 121. The outer pipe section 115 is suitably provided with a wall configuration which is substantially circular. In this embodiment also the peripheral length on the outer surface of the inner pipe section 113 is not substantially less than the peripheral length on the inner surface of the outer pipe section 115. The pipe sections are provided with aligned clearance holes at the outer deformation 117 and a bolt 123 extends therethrough into threaded engagement with a formed nut 125 which engages the inner deformations 119 and 121. It will be appreciated that as the bolt is tightened, cross-sectional dimension of the inner pipe section 113 is increased by causing the wall configuration at the inner deformations 119 and 121 to conform to the wall configuration of the outer pipe section 115. In this condition, the wall of the inner pipe section 113 will be held in compressive stress, and the wall of the outer pipe section 115 will be held in tensile stress.

In FIGS. 18 and 19 there is illustrated an embodiment of the invention in a pipe coupling including an inner pipe section 116 and an outer pipe section 118. The inner pipe section 116 has a preformed wall configuration including an inward deformation 120 which is provided with a bolt hole 122 bounded by an extruded flange. The outer pipe section 118 has a substantially circular wall configuration and is provided with a clearance hole 124 bound by an extruded flange and which is aligned with the bolt hole 122. In this embodiment the peripheral length on the outer surface of the wall of the inner pipe section 116 is not substantially less than the peripheral length on the inner surface of the wall of the outer pipe section 118. The wall thickness of the outer pipe section 118 may be somewhat greater than that of pipe section 116 and to permit or facilitate deformation thereof it is provided with means to reduce the section strength in the vicinity of the deformation 120 as by an elongated slot 126. A bolt 128 extends through the clearance hole 124 into threaded engagement with the extruded flange around bolt hole 122. When the bolt is tightened, the pipe sections are drawn together in the vicinity of the deformation 120 and the wall configurations conform in close fitting engagement. The inner pipe section 116 is maintained in compression and the outer pipe section 118 is maintained in tension.

Figure 20:
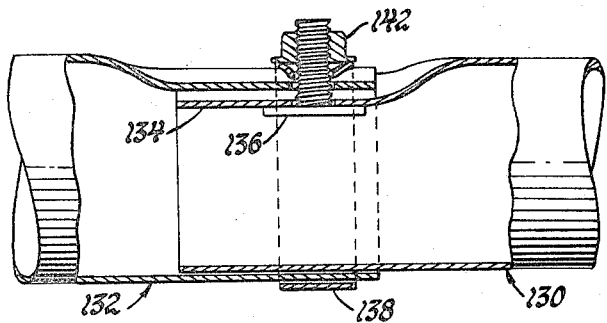
FIG. 20 shows an embodiment of the invention in a pipe coupling with a fastener in captive relationship to the inner pipe section.
Figure 21:
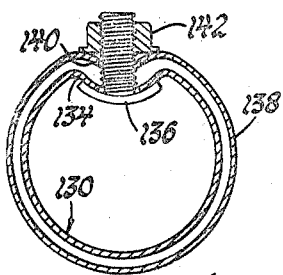
FIG. 21 shows a cross-sectional view of a subassembly of the embodiment shown in FIG. 20.
Figure 22:
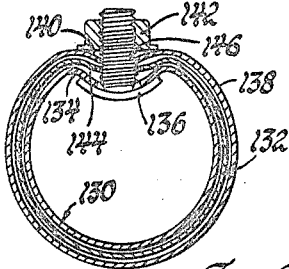
FIG. 22 shows a cross section of the embodiment shown in FIG. 20.
Figure 23:
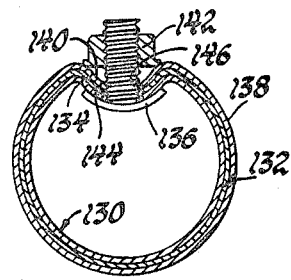
FIG. 23 shows a cross-sectional view of the embodiment shown in FIG. 20 with the pipe sections drawn into coupling engagement.

Referring now to FIGS. 20—23, there is shown a pipe coupling with a subassembly arrangement which is of great advantage in handling and assembling pipe sections to form the coupling on a production line basis. As shown in FIG. 20 and 21, this coupling comprises an inner pipe section 130 and an outer pipe section 132. As in previous embodiments, the inner pipe section 130 is preformed with an inward deformation 134. A bolt 136 has a lead conforming to the deformation 134 and a threaded shank extending outwardly through a clearance hole therein. A support band 138 is provided with a clearance hole to receive the bolt 136 and with an inward deformation 140 having a configuration corresponding to that of the deformation 134. This subassembly is completed by a nut 142. As shown in FIGS. 20 and 22, the outer pipe section 132 is preformed with an inward deformation 144 which is provided with a slot 146 extending from the end of the pipe section to a point near the inward end of the deformation 144. The outer pipe section 132 is fitted over the inner pipe section 130 and within the support band 138 with the slot 146 in alignment with the shank of the bolt 136. With the parts so positioned, the nut 142 is tightened and, as illustrated in FIG. 23, the wall of the inner pipe section 130 in the vicinity of the inward deformation 134 is pulled or deformed outwardly while the wall of the outer pipe section 132 in the vicinity of the inward deformation 144 is pulled inwardly. The support band 138 is likewise drawn inwardly and prevents separation of the wall of the section 144 in the vicinity of the slot 146. Thus, the wall of the inner pipe section 130 and the wall of the outer pipe section 132 are drawn into close fitting engagement with each other with the outer pipe section in a condition of tensile stress, and the inner pipe section in compressive stress.

Figure 26:
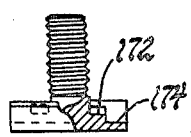
FIG. 26 shows a detail of construction of the embodiment of FIG. 24.
Figure 25:
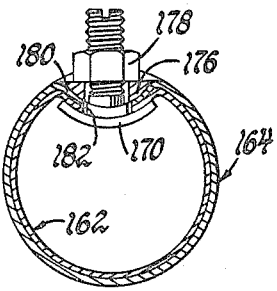
FIG. 25 shows the embodiment of FIG. 24 with the pipe sections drawn into coupling engagement.
Figure 24:
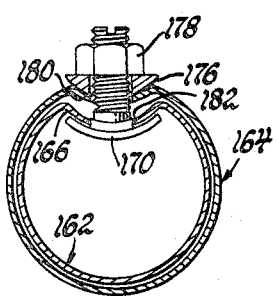
FIG. 24 shows an embodiment of the invention in a coupling with the fastener held in captive relationship with the outer pipe section.

In FIGS. 24, 25 and 26 there is illustrated an embodiment of the invention with a subassembly arrangement in a pipe coupling with an inner pipe section 162 and an outer pipe section 164. The inner pipe section 162 is preformed with an inward deformation 166 and is provided with a slot 182 extending axially from the end of the pipe section to a point near the inner end of the deformation 166. The outer pipe section 164 is provided with an inward deformation 180 of somewhat lesser depth than the deformation 166. The inward deformation 180 includes a clearance hole for a bolt 170 which has a specially formed head with an inner surface 174 having a configuration which conforms to that of the deformation 166 and including a spacer land or squared shank 172. The threaded shank of the bolt 170 extends through the clearance hole in in the inward deformation 180 and receives a specially formed washer 176 having an inner surface configuration which corresponds or conforms to that of the deformation 166 in the inner pipe section 162. A nut 178 on the bolt 170 retains the fastener members in a preassembled relationship with the outer pipe section 164. If desired, the end of the threaded shank on bolt 170 may be provided with a screw driver slot to indicate orientation of the bolt head and to hold the bolt during initial tightening. When the nut 178 is tightened on the bolt 170, as indicated in FIG. 28, the wall of inner pipe section 162 in the vicinity of the depression or deformation 166 is drawn outwardly and the wall of the outer pipe section 164 in the vicinity of deformation of 180 is drawn inwardly so that the wall configurations conform to each other in close fitting engagement. The wall of the inner pipe section 162 is maintained in compressive stress and the wall of outer pipe section 164 is maintained in tensile stress.

Figure 27:
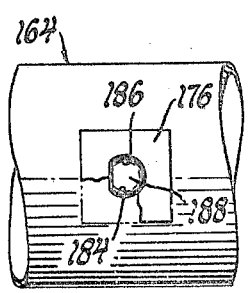
FIG. 27 is a fragmentary view showing a modified construction.

Referring now to FIG. 27, there is illustrated a modified construction especially useful with the embodiment of the invention shown in FIG. 24. The outer pipe section 164 is provided with a noncircular or D-shaped opening 184 having a flat side which serves as a key. The washer 176 is also provided with a noncircular or D-shaped opening 186 having a flat side which serves as a key. The threaded fastener or bolt 188 may be provided with a conventional head configuration such as a hex head or a carriage bolt head having a square shank portion and is further provided with a threaded shank of noncircular or D-shaped cross section having a flat side thereon serving as a keyway. In this construction it is apparent that the bolt 188 is nonrotatably mounted with reference to the outer pipe section 164 and that the washer 176 is nonrotatably mounted with reference to the shank of the bolt 188. Accordingly, the washer 176 is retained in proper alignment with the inward deformation 180 and if a squared shank portion is used on the bolt 188 as a spacer land, it is retained in proper alignment with the slot 182 in the inner pipe section 162. It will now be appreciated that this construction may also be used with the embodiment of the invention shown in FIGS. 20 through 23.

A significant feature of the invention in all of the embodiments described is that the pipe joint may be readily taken apart by loosening the threaded fastener and by axially pulling the pipe sections apart. The ease of separation is due to the fact that the joint is effected by placing one of the members in compressive stress and the other tensile stress with the stresses distributed over a wide band extending around the periphery of the inner and outer pipe sections. Consequently, there is no mechanical interlock formed in the pipe section when the joint is drawn tight. In the case of materials which are of low elasticity and which tend to take a high degree of set, i.e. with a very low elastic limit, such as cold rolled steel as used in automotive exhaust systems, the pipe sections are caused to conform when the joint is tightened, and the very slight amount of springback due to relaxation of the stresses is all that is necessary to permit separation and reinsertion of one pipe section into the other. On the other hand, with material having a high degree of elasticity the pipe sections will tend to recover the initial preformed configuration when the threaded fastener is loosened so that the clearance is the same as that initially provided.

Thus, a pipe coupling is provided which is extremely simple in manufacture, assembly and connection, utilizes a minimum number of parts, provides a complete circumferential surface-to-surface seal, eliminating any possibility of leakage, and is extremely versatile in its application to pipe systems of any kind or configuration. Forcing the outer pipe to conform to the inner pipe, by stretching to the inner pipe, assures the sealing engagement around the periphery of the pipe sections and the securing means readily completes the assembly.

While numerous changes and modifications to the structure will occur to those having skill in the art after having had reference to the foregoing description and drawings, it is not intended to limit the scope of the invention by the foregoing description and drawings but by the scope of the appended claims in which:

I claim:

1. A pipe coupling comprising: a first pipe; a second pipe having an inward deformation in one end thereof, said second pipe being telescopingly received in said first pipe; and force applying means connecting said first and second pipes together at said deformation, said force applying means maintaining said first pipe in tensile stress in the circumferential direction thereby stretching said first pipe in close fitting and sealing engagement around said second pipe.

2. The pipe coupling set forth in claim 1 wherein said means for securing said first and second pipes together includes a screw passing through said first pipe and threadedly received in said deformation in said second pipe.

3. The pipe coupling set forth in claim 2 and further including an inwardly directed annular flange formed in said deformation in said second pipe and threadedly receiving said screw.

4. The pipe coupling set forth in claim 2 and further including an elongated tab formed from the end of said second pipe and reversely bent to extend axially inwardly in parallel adjacent relation to said deformation in said second pipe and threadedly receiving said screw.

5. The pipe coupling set forth in claim 1 including a deformation in said first pipe and wherein said means for securing said first and second pipes together includes a bolt passing through said deformation in said first pipe, and an internally threaded member adjacent said deformation in said second pipe and threadedly receiving said bolt.

6. The pipe coupling set forth in claim 5 wherein said internally threaded member is a nut secured to the inner surface of said deformation in said second pipe.

7. The pipe coupling set forth in claim 1 wherein said inward deformation in said second pipe is arcuately formed about a center exterior of said second pipe.

8. The pipe coupling set forth in claim 1 wherein said second pipe is of a diameter not substantially less than the diameter of said first pipe.

9. The pipe coupling set forth in claim 1 wherein said second pipe has a wall thickness not substantially less than the wall thickness of said first pipe.

10. A pipe coupling comprising: a first pipe having a deformation therein and generally normal to the axis thereof; a second pipe having an outer diameter at least substantially as great as the inner diameter of said first pipe and having a concave deformation therein and generally normal to the axis thereof and of greater depth than said concave deformation in said first pipe, said second pipe being telescopingly received in said first pipe with said deformations in aligned relation; and force applying means connecting said deformations together to draw the deformation in the first pipe toward engagement with the deformation in the second pipe and maintain the first pipe in tensile stress thereby stretching said first pipe into conformity with said second pipe to provide peripheral surface-to-surface sealing engagement therebetween.

11. A pipe coupling comprising: a first pipe having a radially inwardly directed deformity formed therein; a second pipe telescopingly received in said first pipe and having a radially inwardly directed deformity formed therein and being in radially inwardly spaced and aligned relation with said deformity in said first pipe when said second pipe is inserted therein; an aperture in said deformity in said first pipe; an aperture in said deformity in said second pipe and in aligned relation with said aperture in said first pipe when said second pipe is inserted therein; an apertured washer member having an outer surface of substantially the same configuration as said deformity in said second pipe and received in said deformity in said first pipe; and a threaded securing member received in said aperture in said washer and said aperture in said first pipe and threadedly engaging said deformity in said second pipe about said aperture therein, said securing member being tightened to force said deformity in said first pipe into engagement with said deformity in said second pipe and circumferentially stretching said first pipe into sealing engagement with said second pipe.

12. The pipe coupling set forth in claim 11 wherein said second pipe has an outer diameter no less than the inner diameter of said first pipe.

13. The pipe coupling set forth in claim 12 wherein said second pipe has a wall thickness no less than the wall thickness of said first pipe.

14. The pipe coupling set forth in claim 11 wherein said second pipe has a wall thickness no less than the wall thickness of said first pipe.

15. A pipe coupling comprising first and second pipes, one of said pipes having a preformed end portion and one having an end portion with a wall defining an axially extending passage, the second pipe having a deformation therein with a cross-sectional configuration which in at least one position will fit inside the cross-sectional wall configuration of the first pipe and having a peripheral length on the outer surface which is not substantially less than the peripheral length of the opposed inner surface of the wall of the first pipe, and force applying means extending between said pipes at said deformation to draw said pipes together at said deformation for deforming the wall configuration of one of said pipes to change the cross-sectional dimensions thereof to produce a close fitting engagement with the other pipe, said force applying means maintaining the wall of said one of said pipes in the deformed configuration with stresses therein substantially exceeding the residual stresses which obtain when the force applying means is released.

16. A pipe coupling comprising first and second pipes, one of said pipes having a preformed end portion and one having an end portion with a wall defining an axially extending passage, the second pipe having a cross-sectional configuration which in at least one position will fit inside the wall configuration of the first pipe and having peripheral length on the outer surface which is greater than the peripheral length of the opposed inner surface of the wall of the first pipe, and force applying means adapted to act between said pipes for deforming the wall configuration of one of said pipes to change the cross-sectional dimensions thereof and produce a close fitting engagement with the other of said pipes wherein the second pipe is in compressive stress and the first pipe is in tensile stress.

17. The pipe coupling as set forth in claim 15 wherein said second pipe is preformed with a substantially circular wall configuration with an inward deformation therein and said first pipe is preformed with a substantially circular wall configuration and wherein said force applying means is effective to change the cross-sectional dimension of the second pipe by deforming the wall configuration thereof to a substantially circular configuration.

18. The pipe coupling as set forth in claim 16 wherein said first and second pipes are both preformed with a substantially circular wall configuration with an inward deformation therein, the deformation in said second pipe being deeper than the deformation in said first pipe and wherein said force applying means is effective to deform the wall configuration of said first pipe so that it conforms to the wall configuration of said second pipe, the second pipe remaining substantially unchanged from the preformed configuration thereof.

19. The pipe coupling defined in claim 15 wherein the second pipe has a preformed end portion with a wall including an axially elongated inward deformation, said inward deformation having greater depth at one end thereof than at the other whereby the peripheral length on the outer surface of the second pipe is greater at one end of said deformation than at the other end and thereby providing a variable length of wall available for deformation into engagement with the first pipe.

20. The pipe coupling defined in claim 15 wherein the second pipe has a preformed end portion with a wall including an inward deformation, one of said pipes having reduced wall thickness along an axially extending line in the axial vicinity of the inward deformation whereby said deforming is facilitated.

21. A pipe coupling member comprising a pipe having a preformed end portion with a wall defining an axially extending passage, said pipe having a wall configuration including an axially elongated inward deformation extending from the end of said pipe to a radial shoulder, said pipe being adapted to be inserted by axially directed sliding motion into another pipe, said pipe having a peripheral length on its outer surface through said deformation which is not substantially less than the peripheral length on the inner surface of the other pipe, said inward deformation defining an opening at the innermost portion thereof and being adapted to receive a screw threaded fastener whereby said inward deformation may be deformed outwardly by force exerted by said fastener between said pipes when the other pipe is inserted into said pipe.

22. A pipe coupling comprising first and second pipes each having an end portion with a wall defining an axially extending passage, the second pipe having a preformed wall configuration with an inward deformation adjacent the end thereof and which, in at least one position, will fit inside the wall configuration of the first pipe, said second pipe having a peripheral length on the outer surface of said wall which is not substantially less than the peripheral length of the opposed inner surface of the wall of the first pipe, said wall of said second pipe at the inner portion of said inward deformation defining an axially extending slot, a spacer plate adjacent said wall and extending between the edges thereof, and force applying means adapted to act between said plate and said first pipe for deforming the wall configuration of said second pipe to change the cross-sectional dimension thereof and producing tensile stress in the first pipe and compressive stress in the second pipe.

23. The pipe coupling as set forth in claim 22 wherein the wall of said second pipe has a reduced thickness along a line extending axially from the inner end of said slot whereby the deformation of the wall configuration of said second pipe is facilitated by said force applying means and wherein said spacer plate has an axial length extending at least coextensively with said reduced wall thickness to thereby cover any opening that may occur upon deforming the wall configuration.

24. A pipe coupling comprising first and second pipes each having an end portion with a wall defining an axially extending passage, the first pipe having a preformed wall configuration which, in at least one position, will fit inside the wall configuration of the second pipe, one of said pipes having a deformation including an opening in its wall configuration, the other of said pipes having an opening adapted to be aligned with the opening in said one of said pipes, the peripheral length of the outer surface of the inner pipe being not substantially less than the inner surface of the outer pipe, fastener means extending through the opening in one of said pipes and interlocked therewith and adapted to engage the other of said pipes when the two members are fitted together with said openings in alignment, said fastener means being adapted to apply a force acting between said pipes for deforming the wall configuration of one of said pipes to change the cross-sectional dimensions thereof and produce a close fitting mechanical engagement with the other pipe, said fastener retaining the walls of said pipes in said deformed configuration.

25. A pipe coupling comprising first and second pipes each having an end portion with a wall defining an axially extending passage, the second pipe having a preformed wall configuration which includes an inward deformation and having its end portion disposed inside the end portion of the first pipe, the second pipe having a wall configuration with a peripheral length on the outer surface thereof which is not substantially less than the peripheral length of the opposed inner surface of the wall of the first pipe, an opening in one of said pipes, a headed fastener having a shank extending through said opening and an adjustable stop on said shank to retain said fastener in a captive relation with said one of said pipes, the wall of the other of said pipes defining a slot extending from the end thereof to the deformation therein whereby said pipes may be assembled with the second pipe inside the first pipe by sliding the pipes axially with said slot in alignment with said shank of the fastener member, said fastener being adapted to apply a force between said pipes for deforming the wall configuration of at least one of said pipes to change the cross-sectional dimension thereof and produce a close fitting mechanical engagement with the other of said pipes.

26. A pipe coupling comprising first and second pipes each having an end portion with a wall defining an axially extending passage, the first pipe having a preformed wall configuration which includes an inward deformation, the second pipe having a preformed wall configuration which includes an inward deformation of greater depth than the deformation in the first pipe, the second pipe having its end portion disposed inside the end portion of the first pipe with said deformations aligned, the second pipe having a wall configuration with a peripheral length on the outer surface thereof which is greater than the peripheral length of the opposed inner surface of the wall of the first pipe, the deformation in one of said pipes defining an opening, a headed fastener having a shank extending through said opening and an adjustable stop on said shank to retain said fastener in a captive relation with said one of said pipes, the wall of the other of said pipes defining a slot extending from the end thereof to the deformation therein whereby said pipes may be assembled with the second pipe inside the first pipe by sliding the pipes axially with said slot in alignment with said shank of the fastener, said fastener being adapted to apply a force between said pipes for deforming the wall configuration of at least one of said pipes to change the cross-sectional dimension thereof and produce a close fitting mechanical engagement with the other of said pipes wherein the second pipe is in compressive stress and the first pipe is in tensile stress.

27. The pipe coupling defined in claim 26 wherein said second pipe defines said opening with the shank of said fastener extending therethrough, a support band disposed around said second pipe with an opening therein and said fastener extending therethrough, said adjustable stop holding said fastener and band in captive relationship, and wherein said band retains said first pipe from separation at said slot when the fastener applies force between said pipes.

28. A pipe coupling comprising first and second pipes each having an end portion with a wall defining an axially extending passage, the second pipe having a preformed wall configuration which includes an inward deformation and having its end portion disposed inside the end portion of the first pipe, the second pipe having a wall configuration with a peripheral length on the outer surface thereof which is not substantially less than the peripheral length of the opposed inner surface of the wall of the first pipe, said first pipe defining an opening, a headed fastener having a shank extending through said opening and an adjustable stop on said shank to retain said fastener in a captive relation with said first pipe, the wall of the second pipe defining a slot extending from the end thereof whereby said pipes may be assembled with the second pipe inside the first pipe by sliding the pipes axially with said slot in alignment with said shank of the fastener, said fastener being adapted to apply a force between said pipes for deforming the wall configuration of at least one of said pipes to change the cross-sectional dimension thereof and produce a close fitting mechanical engagement with the other of said pipes.

29. The pipe coupling defined in claim 28 wherein said fastener has a threaded shank with a keyway therein, said first pipe defining an opening with a key adapted to engage said keyway, a washer defining a key in the opening thereof adapted to engage said keyway whereby said fastener, first pipe and washer are held against relative rotation by the keys and keyway.

30. A pipe coupling member comprising a pipe having an end portion with a wall defining an axially extending passage, said pipe having a preformed wall configuration which includes an inward deformation defining an opening at the innermost portion thereof, said pipe being adapted to be inserted by axial sliding motion into the wall configuration of another pipe, said pipe having a peripheral length on the outer surface thereof which is not substantially less than the peripheral length of the opposed inner surface of the wall of the other pipe, a support band disposed around said pipe and defining an opening therein, a headed fastener having a shank extending through the opening in said pipe and through the opening in said support band, an adjustable stop on said shank to retain said fastener and band in captive relationship with said pipe whereby said pipe and band are adapted to receive said other pipe therebetween and said fastener may be tightened to deform said other pipe in the vicinity of said deformation by applying a force between said pipes and produce a close fitting mechanical engagement therebetween.

31. A pipe coupling comprising first and second pipes each having an end portion with a wall defining an axially extending passage, the first pipe having a preformed wall configuration which includes an inward deformation, the second pipe having a preformed wall configuration which includes an inward deformation of greater depth than the deformation in the first pipe, the second pipe having its end portion disposed inside the end portion of the first pipe with said deformations aligned, the second pipe having a wall configuration with a peripheral length on the outer surface thereof which is greater than the peripheral length of the opposed inner surface of the wall of the first pipe, the deformation in the first pipe defining an opening, a threaded fastener having a head and a shank extending outwardly through said opening and a washer on said fastener having an inner surface corresponding to the shape of the inward deformation in the first pipe, a nut on said shank to retain said fastener and washer in a captive relation with said first pipe, the wall of the second pipe defining a slot extending from the end thereof to the deformation therein whereby said pipes may be assembled with the second pipe inside the first pipe by sliding the pipes axially with said slot in alignment with said shank of the fastener, said fastener being adapted to apply a force between said pipes for deforming the wall configuration of at least one of said pipes to change the cross-sectional dimension thereof and produce a close fitting mechanical engagement with the other of said pipes wherein the second pipe is in compressive stress and the first pipe is in tensile stress.

32. The pipe coupling defined in claim 31 wherein said fastener has a shank with a keyway therein, said first pipe defining a key in said opening adapted to engage said keyway, said washer defining a key in the opening thereof adapted to engage said keyway whereby said fastener, first pipe and washer are held against relative rotation by the keys and keyway.

33. A pipe coupling member comprising a pipe having an end portion with a wall defining an axially extending passage and having a preformed wall configuration which includes an inward deformation, said pipe being adapted to have its end portion disposed over the end portion of another pipe having a wall configuration with an inward deformation and a slot extending axially from its end with a peripheral length on the outer surface thereof which is greater than the peripheral length of the opposed inner surface of the wall of said pipe, the deformation in said pipe defining an opening, a fastener having a head and a threaded shank, the shank extending through said opening and a washer on said fastener having an inner surface corresponding to the shape of the inward deformation in said pipe, a nut on said shank to retain said fastener and washer in a captive relation with said pipe, the head of said fastener including a spacer land adjacent said shank, whereby said pipe is adapted to receive the other pipe by axial insertion thereof with said slot in alignment with said spacer land of the fastener, said fastener being adapted to apply a force between said pipes for deforming the wall configuration of at least one of said pipes to change the cross-sectional dimension thereof and produce a close fitting mechanical engagement with the other of said pipes.

34. For use in a pipe coupling of the type comprising first and second pipes one of which has an end portion adapted to fit inside the end portion of the other, the inner one having a preformed inward deformation defining an axially extending slot and the outer having a preformed inward deformation defining an opening, the inner pipe having peripheral length on its outer surface which is not substantially less than the peripheral length on the inner surface of the outer pipe, a threaded fastener having a head and a threaded shank, said head having an inner surface of concave cross section corresponding to the configuration of the inward deformation in the inner pipe, said head also including a spacer land adjacent said shank having a width corresponding to said slot and adapted to be received therein with said shank extending through said opening, said fastener being adapted to receive a washer and a nut whereby force may be applied between said pipes for deforming the walls thereof into close fitting engagement.

35. A pipe coupling member comprising a pipe having an end portion with a wall defining an axially extending passage and having a preformed wall configuration which includes an axially elongated inward deformation extending from the end of said pipe to a radial should therein, said pipe being adapted to have its end portion disposed over the end portion of another pipe having a wall configuration with an inward deformation and a slot extending axially from its end with a peripheral length on the outer surface thereof which is greater than the peripheral length on the opposed inner surface of the wall of said pipe, the deformation in said pipe defining a noncircular opening, a fastener having a head and a threaded shank, the shank extending through said opening and having a cross section conforming thereto, a washer on said shank and having a non circular opening whereby the fastener, washer and pipe are held against relative rotation, said washer having an inner surface corresponding to the shape of the inward deformation in said pipe, a nut on said shank to retain said fastener and washer in a captive relation with said pipe, whereby said pipe is adapted to receive the other pipe by axial insertion thereof with said slot in alignment with said shank of the fastener, said fastener being adapted to apply a force between said pipes for deforming the wall configuration of at least one of said pipes to change the cross-sectional dimension thereof and produce a close fitting mechanical engagement with the other of said pipes.